US012175861B2

(12) United States Patent
Schulte et al.

(10) Patent No.: US 12,175,861 B2
(45) Date of Patent: Dec. 24, 2024

(54) IMAGE SENSOR MAPPING FOR TRAFFIC CONTROL SYSTEMS AND METHODS

(71) Applicant: FLIR Belgium BVBA, Meer (BE)

(72) Inventors: Stefan Schulte, Marke (BE); Martijn Withouck, Lauwe (BE); Wouter Favoreel, Wevelgem (BE)

(73) Assignee: FLIR BELGIUM BVBA, Meer (BE)

( * ) Notice: Subject to any disclaimer, the term of this patent is extended or adjusted under 35 U.S.C. 154(b) by 545 days.

(21) Appl. No.: 17/362,825

(22) Filed: Jun. 29, 2021

(65) Prior Publication Data

US 2021/0327265 A1    Oct. 21, 2021

Related U.S. Application Data

(63) Continuation of application No. PCT/US2019/068834, filed on Dec. 27, 2019.

(60) Provisional application No. 62/787,187, filed on Dec. 31, 2018.

(51) Int. Cl.
| | |
|---|---|
| *G08G 1/04* | (2006.01) |
| *G01S 19/14* | (2010.01) |
| *G06T 7/70* | (2017.01) |
| *G06V 20/54* | (2022.01) |
| *G08G 1/087* | (2006.01) |

(52) U.S. Cl.
CPC ............... *G08G 1/04* (2013.01); *G01S 19/14* (2013.01); *G06T 7/70* (2017.01); *G06V 20/54* (2022.01); *G08G 1/087* (2013.01); *G06T 2207/30236* (2013.01); *G06V 2201/08* (2022.01)

(58) Field of Classification Search
CPC . G08G 1/04; G08G 1/087; G06T 7/70; G06V 20/54; G01S 19/14
See application file for complete search history.

(56) References Cited

U.S. PATENT DOCUMENTS

| | | | |
|---|---|---|---|
| 2005/0116838 A1* | 6/2005 | Bachelder | G08G 1/087 348/148 |
| 2010/0295948 A1* | 11/2010 | Xie | G06T 7/80 348/E17.002 |
| 2011/0299730 A1* | 12/2011 | Elinas | G06T 7/73 382/103 |
| 2015/0105933 A1 | 4/2015 | Martin et al. | |
| 2017/0116477 A1 | 4/2017 | Chen et al. | |
| 2018/0059669 A1 | 3/2018 | Madigan et al. | |

(Continued)

FOREIGN PATENT DOCUMENTS

EP    3078014    10/2016

*Primary Examiner* — David Perlman
(74) *Attorney, Agent, or Firm* — Haynes and Boone, LLP

(57) ABSTRACT

Systems and methods for controlling traffic signaling includes a wireless sensor operable to detect and receive wireless signals emitted from a vehicle, an image sensor operable to capture a stream of images of a field of view. A traffic control system is operable to extract geographic positioning information for the vehicle from the wireless signals, track the vehicle's movement using the extracted geographic positioning information, detect and track an object in the stream of images corresponding to the vehicle. The vehicle's geographic movement is further tracked using a pixel location of the object in steam of images and a traffic control action is executed based on the geographic movement to facilitate passage of the at least one vehicle through a monitored traffic control location.

20 Claims, 7 Drawing Sheets

(56) References Cited

U.S. PATENT DOCUMENTS

2018/0174321 A1\* 6/2018 Lee .................... G01C 21/1656
2020/0020143 A1\* 1/2020 Yu .......................... B60K 35/00

\* cited by examiner

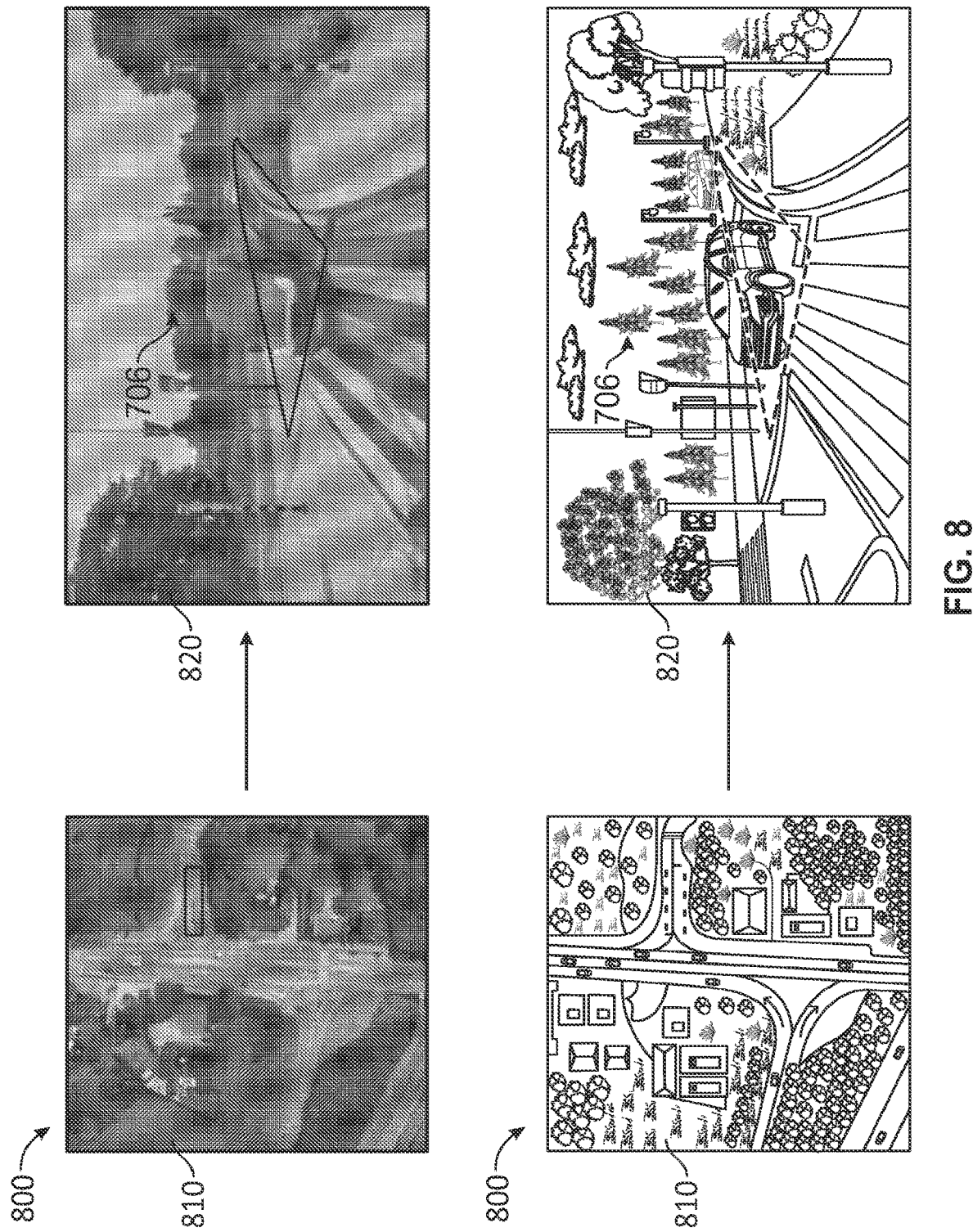

IMAGE SENSOR MAPPING FOR TRAFFIC CONTROL SYSTEMS AND METHODS

CROSS-REFERENCE TO RELATED APPLICATIONS

This application is a continuation of International Patent Application No. PCT/US2019/068834 filed Dec. 27, 2019 and entitled "IMAGE SENSOR MAPPING FOR TRAFFIC CONTROL SYSTEMS AND METHODS," which is hereby incorporated by reference in its entirety.

International Patent Application No. PCT/US2019/068834 claims priority to and benefit of U.S. Provisional Patent Application No. 62/787,187 filed Dec. 31, 2018 and entitled "IMAGE SENSOR MAPPING FOR TRAFFIC CONTROL SYSTEMS AND METHODS," which is hereby incorporated by reference in its entirety.

TECHNICAL FIELD

The present application relates generally to vehicle and traffic infrastructure communications and, more particularly for example, to system and methods for real-time communications between vehicles, including emergency response vehicles, and traffic control systems.

BACKGROUND

Traffic signals at intersections and along roadways utilize various traffic control systems to monitor and affect traffic signalization. These traffic control systems are typically positioned adjacent to the intersection they control (e.g., disposed upon a traffic signal pole). Traffic control systems generally comprise an enclosure constructed from metal or plastic to house electronic equipment such as sensor (e.g., an imaging camera or other device), communications components and control components to provide instructions to traffic signals or other traffic control/monitoring devices.

Within a traffic control system, a traffic signal controller may be used to manipulate the various phases of a traffic signal. The operation of the traffic signal may be adaptive, responsive, pre-timed, fully-actuated, or semi-actuated depending upon the hardware available at the intersection and the amount of automation desired by the operator (e.g., a municipality). For instance, cameras, loop detectors, or radar may be used to detect the presence, location and/or movement of one or more vehicles. In response to a vehicle being detected, a traffic signal controller may alter the timing of the traffic signal cycle, for example, to shorten a red light to allow a waiting vehicle to traverse the intersection without waiting for a full phase to elapse or to extend a green phase if it determines an above-average volume of traffic is present and the queue needs additional time to clear.

The nature of traffic congestion makes it difficult to predict and therefore difficult to avoid. For instance, traffic collisions and stalled vehicles may occur anywhere within a traffic network, causing a localized disturbance in traffic flow which may ripple throughout the system. Additionally, not all disruptions in traffic flow are caused by substantial events such as collisions and breakdowns. Minor delays may be created by human behavior which may aggregate into significant delays. These and other traffic conditions make it difficult for emergency vehicles tasked with traversing unpredictable traffic congestion to reach their destinations, and for traffic control systems to optimize traffic flow in emergency situations. In view of the foregoing, there is a continued need for improved traffic control systems and methods, including systems and methods for optimizing traffic flow during emergency situations.

SUMMARY

Improved traffic infrastructure systems and methods are disclosed herein. In various embodiments, an intelligent transportation system (ITS) includes vehicle-to-everything (V2x) communications facilitating communication between certain vehicles (e.g., ambulances, fire trucks, and police cars), and one or more traffic control systems. The traffic control systems may include including one or more sensors (e.g., an imaging sensor) disposed to monitor vehicles at a traffic location, and a control processor to control traffic lights and/or other devices. In some embodiments, the traffic control system is equipped with communications components operable to communicate with compatible V2X communications devices. One or more vehicles may be equipped with corresponding V2X communications components that allow communications with components of the traffic infrastructure system, such as a camera equipped with a V2X receiver. In some embodiments, the camera for monitoring traffic conditions is communicably coupled to a local traffic control system, such as an intersection controller. In operation, the camera may receive a signal from an emergency or other priority vehicle and provide real time control of the traffic lights (or other traffic control devices) to ensure the safety of the priority vehicle and facilitate efficient passage. In some embodiments, the vehicle communications system tracks location and other status information, including the vehicle GPS location and transmits secure V2X messages to traffic control components identifying the vehicle and geographic location. In some embodiments, traffic control devices are calibrated through a process for mapping image pixel coordinates to the real-world GPS coordinates and vice versa.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

FIG. 8 is an example of GPS and object pixel mapping, in accordance with one or more embodiments.

DETAILED DESCRIPTION

Figure 1:
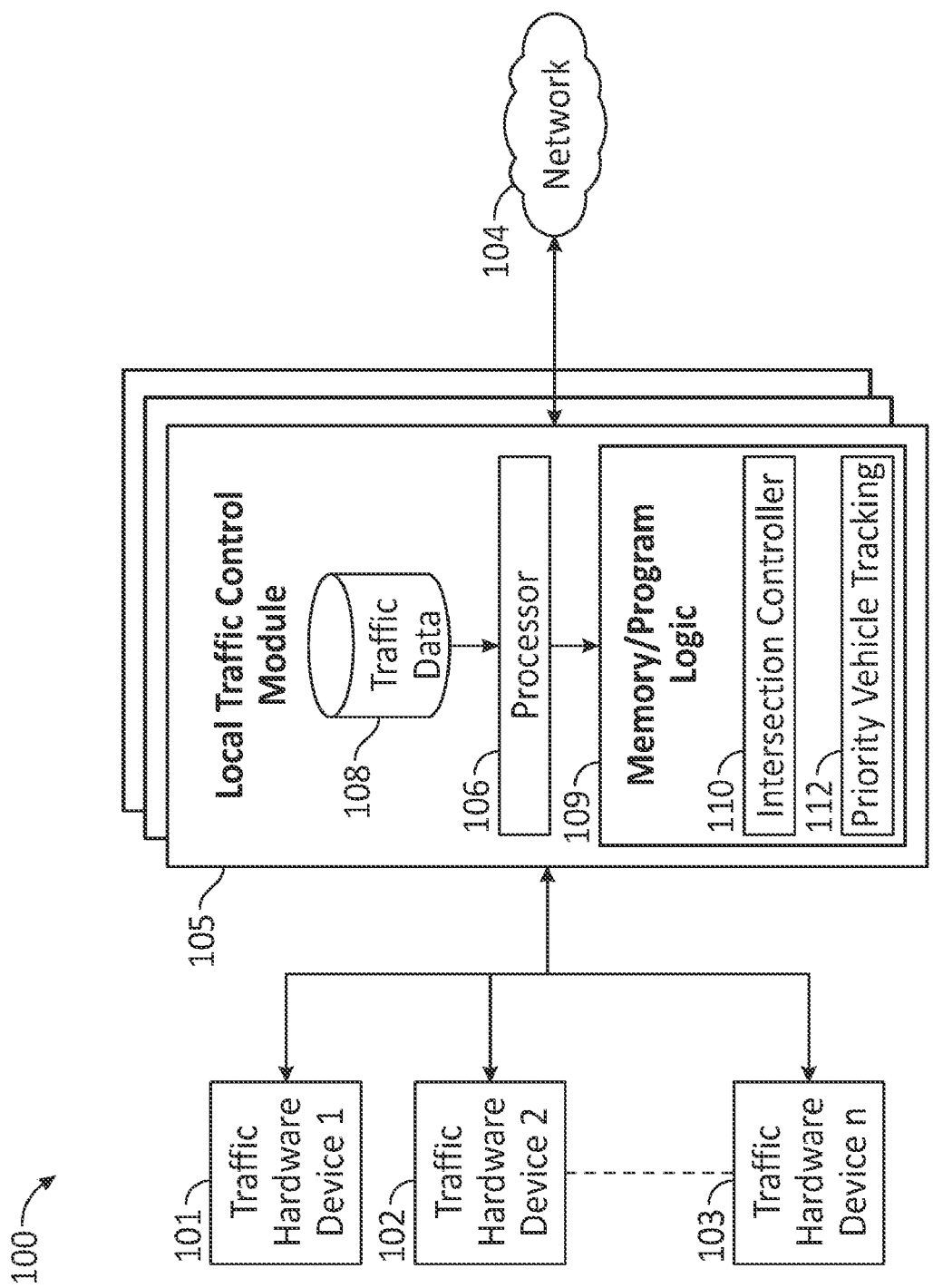
FIG. 1 illustrates an example intelligent transportation system, in accordance with one or more embodiments.

The present disclosure illustrates various embodiments of improved traffic infrastructure systems and methods. In some embodiments, an intelligent transportation system (ITS) includes vehicle-to-everything (V2x) communications facilitating communication between certain vehicles (e.g., ambulances, fire trucks, and police cars), and one or more traffic control systems. Image sensor mapping for vehicle to everything systems and methods are also provided in various embodiments.

In some embodiments, an intelligent transportation system may include one or more traffic control devices disposed to monitor one or more traffic locations, one or more sensors (e.g., an imaging sensor, loop detector, radar or other sensor) and a control processor to control the operation of signals at the traffic location (e.g., traffic lights at an intersection).

In some embodiments, the traffic control device is equipped with communications components (e.g., 802.11p wireless protocol, cellular, Bluetooth, wifi, or other wireless components) that can communicate with compatible V2X communications devices. One or more vehicles may also be equipped with corresponding communications components that allow communications with components of the traffic infrastructure system, such as a camera equipped with a V2X receiver. In some embodiments, the camera is communicably coupled to the traffic controller at an intersection or other traffic monitoring and control location. In operation, the camera may capture a stream of images of the intersection, detect and track objects in the captured images (e.g., vehicle traffic, pedestrian traffic) and control the traffic control components in accordance therewith. In some embodiments, the camera is further operable to receive a signal from an emergency or other priority vehicle and provide real time control of the traffic signs and/or lights to ensure the safe and efficient passage of the priority vehicle through the intersection. In some embodiments, the vehicle communications system tracks status information, including the vehicle geographic location and generates V2X messages from a V2X module of the vehicle to transmit the status information to the traffic control components.

In various embodiments, the traffic control systems disclosed herein provide calibration functionality for mapping between captured image pixels and GPS locations. For example, the traffic control system may include a process for mapping between pixel positions and real-world coordinates. In some embodiments, this mapping is relative with respect to the camera. In some embodiments a traffic control system may be configured and calibrated through a process that includes positioning an object in the view of view at one or more known geographic locations, and detecting the pixel location of the object in the captured image. In some embodiments, the camera is also equipped with video analytic making it possible to communicate some detections back to the vehicle. For example, if the infrastructure control system detects pedestrians, bikes or other obstacles in the intersection, information can be sent back to the priority vehicle so that it could be on alert to and adapt to the detected situation. In some embodiments, the camera may be configured to receive and track geographic position data or other data as necessary to determine traffic control parameters. For example, the camera can determine a GPS location, speed and direction of travel of the vehicle through GPS data from the vehicle through the wireless communications interface. The camera can also access other traffic infrastructure systems to determine local traffic conditions and estimate a time of arrival in the intersection.

In some embodiments, the traffic monitoring camera is configured to track the location of a vehicle, including tracking using GPS coordinators, tracking based on pixel location, and transitioning between using GPS coordinates and pixel coordinates on captured images. In one embodiment, the camera may be calibrated by setting up the camera, capturing images using a GPS sensor and communications transceiver to transmit GPS data to the camera. The camera may then detect the location of the GPS sensor on the image and map the pixel location to the receive GPS coordinates. It will be understood that the GPS coordinates may be averaged/smoothed across a plurality of pixels on the image, which may then be set as the corresponding GPS coordinates for a pixel location. In another embodiment, the camera may automatically calibrate using tilt angle, height and direction of the camera, and known identifiable from the field of view of the camera. In another approach, the GPS data may be automatically calibrated from information from other vehicles passing by. In one approach, the system is initialized with at least one known GPS location in the field of view and the system may track the object and GPS locations as the object moves through the field of view. In another approach, the traffic monitoring system tracks identified objects appearing in the imaged scene and finds a best match between an object track in the image and the GPS coordinates of the object.

Systems and methods in accordance with one or more embodiments will now be described with reference to the figures. FIG. 1 illustrates example intelligent transportation system (ITS) 100, in accordance with one or more embodiments. The ITS 100 is operable to monitor and control traffic signaling for at least one location. In the illustrated system, traffic signal information is obtained by a network of traffic hardware devices 101-103. Traffic hardware devices may be, for example, a traffic controller, traffic camera, intersection controller, inductive loop detector, microwave detector, magnetometer, traffic radar, thermal sensor, conflict monitor, general hardware I/O, road weather information system or other system. The traffic hardware devices 101-103 may be disposed within, on, under, adjacent, above, or otherwise relative to a roadway. Traffic hardware devices may be stored, for example, within a traffic control cabinet or upon a support mast.

The traffic hardware devices 101-103 may provide raw or preprocessed data to a local traffic control module (LTCM) 105. The LTCM 105 may be embodied as a single device or may be a system distributed across multiple devices in operative communication. The traffic hardware devices 101-103 may be connected to the LTCM 105 via a wireless and/or wired connection. Such a connection may be via a network or direct communication channel. The illustrated LTCM 105 includes a processor 106 that can access data including traffic data stored in memory module 108. Such traffic data may be obtained from traffic hardware devices 101-103. In addition, processor 106 may access one or more algorithms from stored program logic 109, including an intersection controller 110, for controlling traffic at an intersection in response to receive sensor data, and a priority vehicle tracking module 112, operable to communicate with and track a priority vehicle and facilitate intersection control in accordance therewith. Various system components may be connected to a network 104, such as the cloud, for data sharing and/or offline processing.

Figure 2:
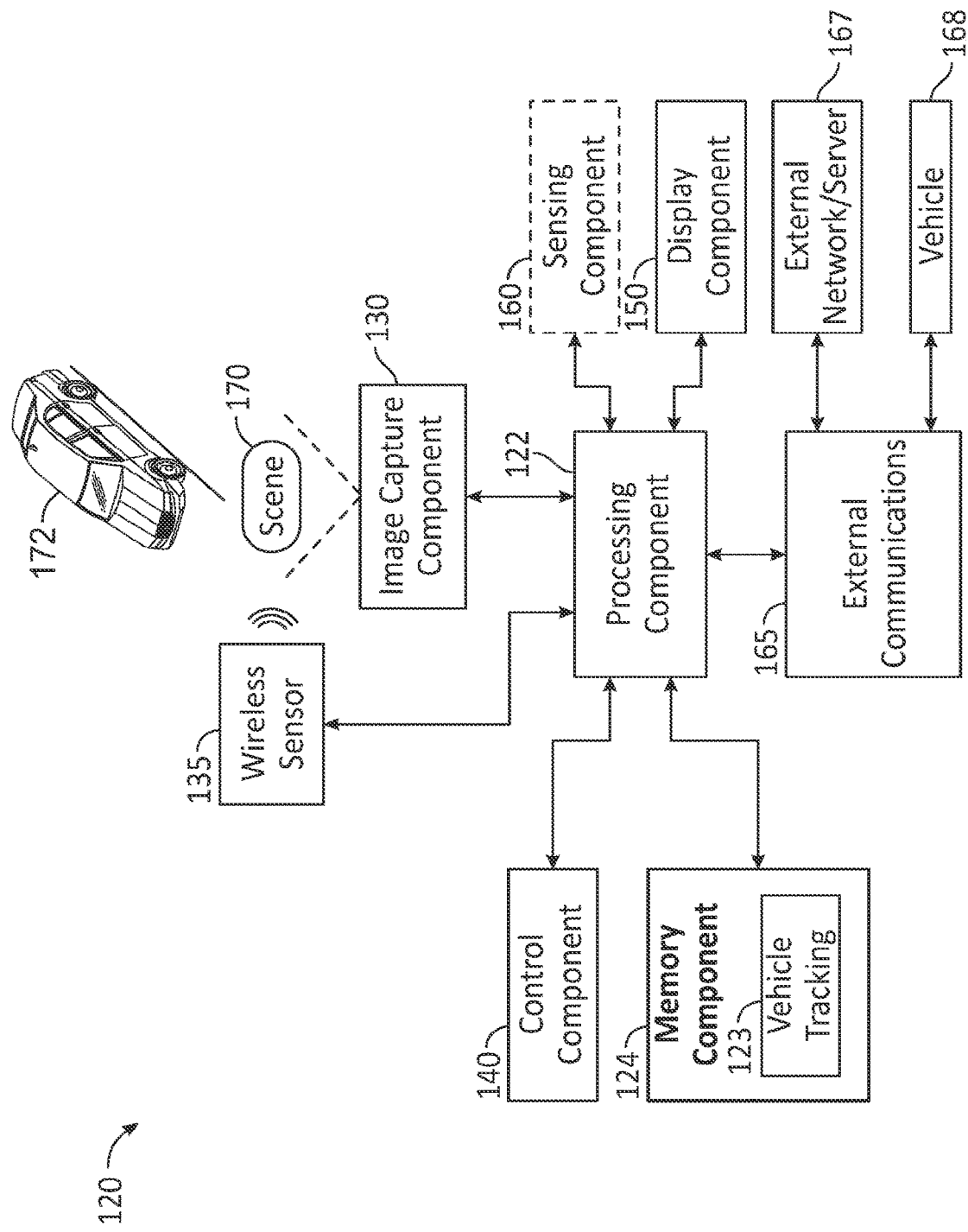
FIG. 2 is an image processing system in accordance with one or more embodiments.

Turning now to FIG. 2, an exemplary monitoring system 120 for use in a traffic monitoring and control system will be described in accordance with various embodiments. The monitoring system 120 is operable to capture and process images and includes, in one implementation, a processing component 122, a memory component 124, an image capture component 130, a wireless sensor component 135, a control component 140, and/or a display component 150. The monitoring system 120 may further include an additional sensing component 160 and external communications components 165, providing communications with one or more external networks or servers 167 and vehicles 168.

In various embodiments, monitoring system 120 may represent, for example, an imaging system such as a visible light imaging device (e.g., a video camera), an infrared imaging device, or a multi-band imaging device for capturing and processing images, such as video images of a scene 170. In some embodiments, monitoring system 120 may represent an infrared camera adapted to detect infrared radiation and provide representative data and information (e.g., infrared image data of a scene) or may represent more generally any type of electro-optical sensor system. Monitoring system 120 may comprise a single location installation and/or a distributed networked system.

In various embodiments, processing component 122 may comprise any type of a processor or a logic device (e.g., a programmable logic device (PLD) configured to perform processing functions). Processing component 122 may be adapted to interface and communicate with components 124, 130, 135, 140, 150, 160 and 165 to perform method and processing steps and/or operations, as described herein such detecting, tracking and communicating with a vehicle 172, and facilitating traffic control actions.

Memory component 124 comprises, in one embodiment, one or more memory devices adapted to store data and information, including for example image data, wireless data and object identification and tracking information. Memory component 124 may comprise one or more various types of memory devices including volatile and non-volatile memory devices. In one aspect, the memory component 124 comprises a random-access memory (RAM), a read-only memory (ROM), component electronically programmable read-only memory (EPROM), erasable electronically programmable read-only memory (EEPROM), other flash memory, Secure Digital (SD) Card, as well as other suitable forms of memory. The functions of the monitoring system 120 may be implemented through dedicated hardware and circuitry and software programs that may be installed into the memory component 124 of the monitoring system 120. The monitoring system 120 generally includes several software programs or modules, each comprising a plurality of executable instructions which, when stored in the memory component 124, cause the processing component 122 to perform the processes shown and described hereinafter.

In various embodiments, the processing component 122 comprises an embedded microprocessor for data processing as well as controlling the operation of the monitoring system 103. Generally, the embedded microprocessor comprises a plurality of digital and analog ports for interfacing with the different components of the monitoring system 120. In one aspect, the microprocessor controls the image capture component 130 and wireless sensor component 135, commands the sensors to capture data, processes the data, and provides an output in accordance with various aspects in the present disclosure. In one aspect, the embedded microprocessor comprises a system-on-chip as well as a digital signal processing (DSP) architecture, peripherals for interfacing with the different components in the monitoring system 120, peripherals for networking, booting and encryption, and may run an operating system.

The monitoring system 120 may be programed via external communications components 165 to perform various aspects of the present disclosure, and any resulting software programs are generally stored in the memory component 124. In one aspect, the microprocessor commands the image and wireless sensors to acquire data from an associated area, processes the data from the different sensors, and outputs analytical results according to the various embodiments of the present disclosure. The monitoring system 120 may also comprise ports of power delivery, programing, data transfer, networking and any other component as required by the processes described by the various embodiments of the present disclosure.

Image capture component 130 comprises, in one embodiment, any type of image sensor operable to detect and track traffic, pedestrians and other objects appearing in the scene 170. For example, the image capture component 130 may include an image sensor having one or more image detector elements such as visible light photodetector elements or infrared photodetector elements for capturing infrared image data (e.g., still image data and/or video data) representative of a scene such as scene 170. In one aspect, one or more sensors may be housed in separate sections in the monitoring system 120, and interfaced with the rest of the monitoring system 120 via internal connections, such as digital or analog busses or connectors. In one aspect, the sections in the monitoring system 120 may comprise the supporting structure and components required to enable normal operation of the imaging sensors.

In one embodiment, image capture component 130 may be configured to generate digital image data representing incoming image light from scene 170. Image capture component 130 may include one or more signal processing components such as analog-to-digital converters included as part of an image sensor or separate from the image sensor as part of monitoring system 120. In one aspect, image data (e.g., video data) may comprise non-uniform data (e.g., real image data) of a scene such as scene 170. Processing component 122 may be adapted to process the image data (e.g., to provide processed image data), store the image data in memory component 124, and/or retrieve stored image data from memory component 124. For example, processing component 122 may be adapted to process image data stored in memory component 124 to provide processed image data and information (e.g., captured and/or processed image data). Processing component 122 may further include (or be controlled by) vehicle tracking logic 123 for tracking vehicle locations (e.g., through image processing and/or GPS data received from the vehicle), analyzing vehicle and traffic information and facilitating traffic control actions to facilitate the passage of the vehicle through the monitored intersection.

Control component 140 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 122 may be adapted to sense control input signals from a user via control component 140 and respond to any sensed control input signals received therefrom. Processing component 122 may be adapted to interpret such a control input signal as a parameter value, as generally understood by one skilled in the art. In one embodiment, control component 140 may comprise a separate control unit (e.g., a wired or wireless unit) having push buttons adapted to interface with a user and receive user input control values. In one implementation, the push buttons of the control unit may be used to control various functions of the monitoring system 120, such as autofocus, menu enable and selection, field of view, brightness, contrast, noise filtering, high pass filtering, low pass filtering, and/or various other features as understood by one skilled in the art.

The monitoring system 120 may include an optional display component 150 which comprises, in one embodiment, an image display device (e.g., a liquid crystal display (LCD) or various other types of generally known video displays or monitors). Processing component 122 may be adapted to display image data and information on the display component 150. Processing component 122 may be adapted to retrieve image data and information from memory component 124 and display retrieved image data and information on display component 150. Display component 150 may comprise display electronics, which may be utilized by processing component 122 to display image data and information (e.g., infrared images). In some embodiments, display components may be provided through other user devices (e.g., a mobile device or desktop computer) that access processed data via a network or server system.

Optional sensing component 160 comprises, in one embodiment, one or more additional sensors of various types, depending on the application or implementation requirements of the monitoring system 103, as would be understood by one skilled in the art. The sensors of optional sensing component 160 provide data and/or information to at least processing component 122. In one aspect, processing component 122 may be adapted to communicate with sensing component 160 (e.g., by receiving sensor information from sensing component 160) and with image capture component 130 (e.g., by receiving data and information from image capture component 130 and providing and/or receiving command, control, and/or other information to and/or from one or more other components of monitoring system 120).

In various implementations, optional sensing component 160 may provide additional information regarding environmental conditions, such as temperature, lighting conditions (e.g., day, night, dusk, and/or dawn), and/or specific weather conditions (e.g., sun, rain, and/or snow). Sensing component 160 may represent conventional sensors as generally known by one skilled in the art for monitoring various conditions (e.g., environmental conditions) that may have an effect (e.g., on the image appearance) on the data provided by image capture component 130. In some implementations, optional sensing component 160 (e.g., one or more of sensors) may comprise devices that relay information to processing component 122 via wired and/or wireless communication.

In various embodiments, components of monitoring system 120 may be combined and/or implemented, as desired or depending on the application or requirements, with monitoring system 120 representing various functional blocks of a related system. In one example, processing component 122 may be combined with memory component 124, image capture component 130, display component 150, and/or optional sensing component 160. In another example, processing component 122 may be combined with image capture component 130 with only certain functions of processing component 122 performed by circuitry (e.g., a processor, a microprocessor, a logic device, a microcontroller, etc.) within image capture component 130. Furthermore, various components of monitoring system 120 may be remote from each other (e.g., image capture component 130 may comprise a remote sensor with processing component 122, etc. representing a computer that may or may not be in communication with image capture component 130).

External communication components 165 can include a variety of suitable input/output connection interfaces, such as wired connections, standard serial ports, parallel ports, S-video ports, large area network (LAN) ports, small computer system interface (SCSI) ports, or other suitable wired connections. Additionally, the external communication components 165 can include, for example, wireless connections, such as 802.11p, infrared ports, optical ports, Bluetooth wireless ports, wireless LAN ports, ultra-wide band (UWB) wireless ports, among others as will occur to one of ordinary skill in the art.

As will be understood by one of ordinary skill in the art, the hardware and specific circuitry of embodiments of the monitoring system 120 can vary according to aspects of the present disclosure. Accordingly, although examples of the hardware associated with the monitoring system 120 have been previously described, it is not intended that the present disclosure be limited to the specific embodiments or aspects presented, and other variations of the monitoring system 120 will be apparent to one of ordinary skill in the art.

In some embodiments, the processing component 122 is operable to monitor vehicle motion and facilitate communications with priority vehicles that have been granted access to the traffic monitoring system. For example, the processing component 122 may receive GPS data from a priority vehicle (e.g., vehicle 172), allowing the processing component 122 to track the geographic location of the vehicle. The processing component 122 may also track the location of the priority vehicle through image capture, object detection and mapping image pixels associated with the detected object to geographic coordinates. In various embodiments, the priority vehicle may pass through the field of view of, or pass within and out of communication range with, multiple monitoring systems, which may communicate over a network to share vehicle and traffic information. The processing component 122 may also track other traffic and objects within the field of view.

In various embodiments, the priority vehicle identifies itself to the monitoring system 120, for example, by a unique identifier, priority vehicle type (e.g., police car, ambulance) and/or priority classification. The processing component 122 may access programmed rules associated with the priority vehicle and apply the rules to the input data and traffic information to determine a traffic control command. In some embodiments, the processing component 122 may transmit instructions or other data to the priority vehicle for use by a local vehicle computer system and/or a vehicle operator.

Figure 3:
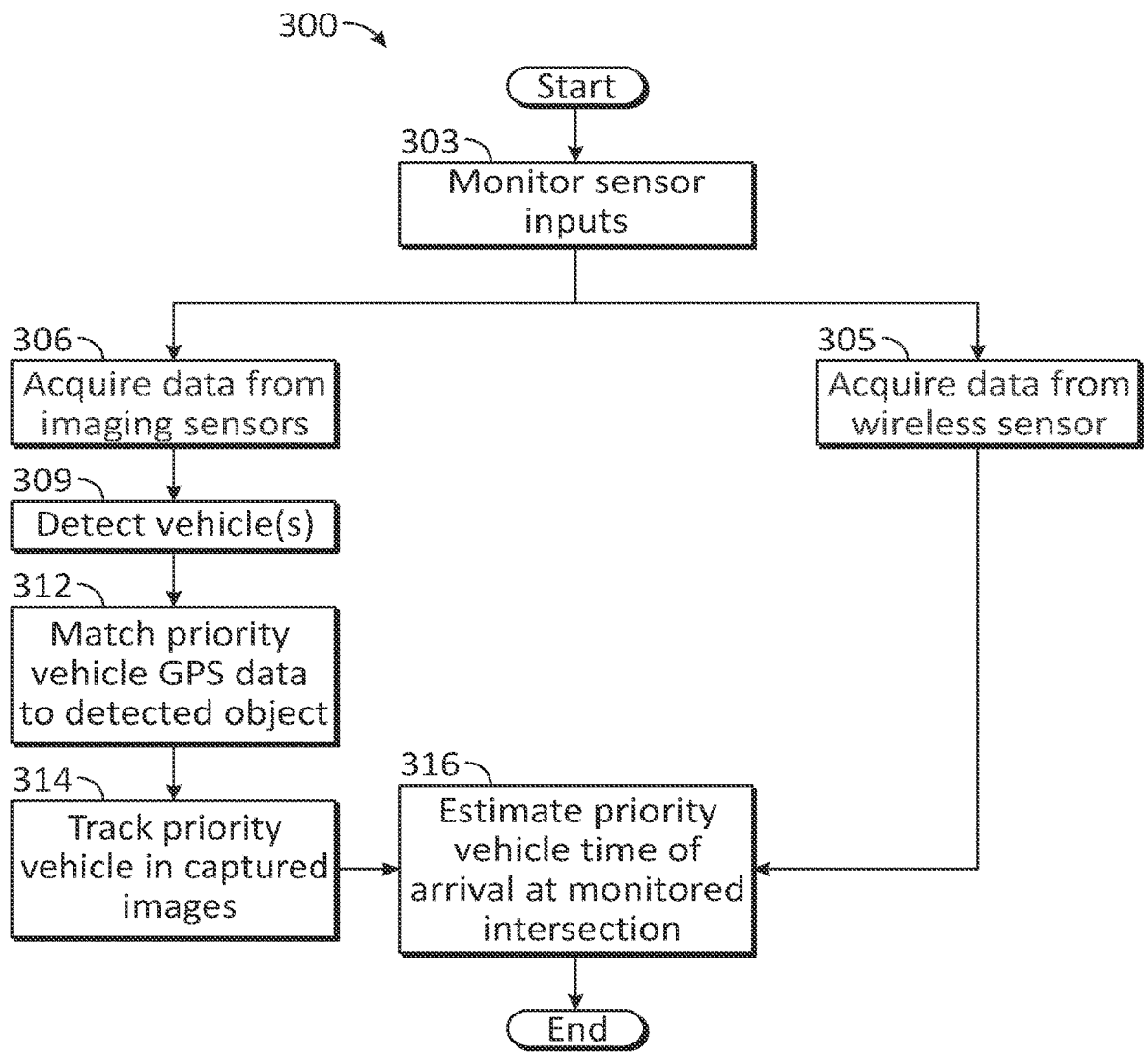
FIG. 3 is an example flow chart illustrating a vehicle tracking process, in accordance with one or more embodiments.

Turning now to the processes, methods, and other functionalities performed by the systems, devices, software, modules, algorithms, and other components of the present disclosure, FIG. 3 illustrates an exemplary vehicle tracking process in accordance with one or more embodiments. In one embodiment, a traffic monitoring system receives sensor input data (step 303) and processes the data to track traffic and one or more priority vehicles. In step 305, the system receives wireless communications from a priority vehicle, including GPS data, which may then be used in step 316 to track the priority vehicle and estimate a priority vehicle time of arrival at the monitored location. In parallel, image data is acquired (step 306) from a field of view and analyzed to detect one or more vehicles (step 309). Next, in step 312 the vehicles detected in the images are mapped to geographic locations (e.g., by mapping object pixel locations to real world coordinates) and a matched to one or more priority vehicles (e.g., by comparing determined geographic locations to GPS data received via the wireless interface from one or more priority vehicles). The priority vehicle is then tracked through image object detection and tracking (step 314) to determine its proximity to the monitored traffic location and to estimate a time of arrival of the priority vehicle at the monitored location (step 316). In some embodiments, the method 300 uses received GPS data when the priority vehicle is out of view of the image capture components, and transitions to pixel mapped geographical location when the priority vehicle is in visible range.

Figure 4:
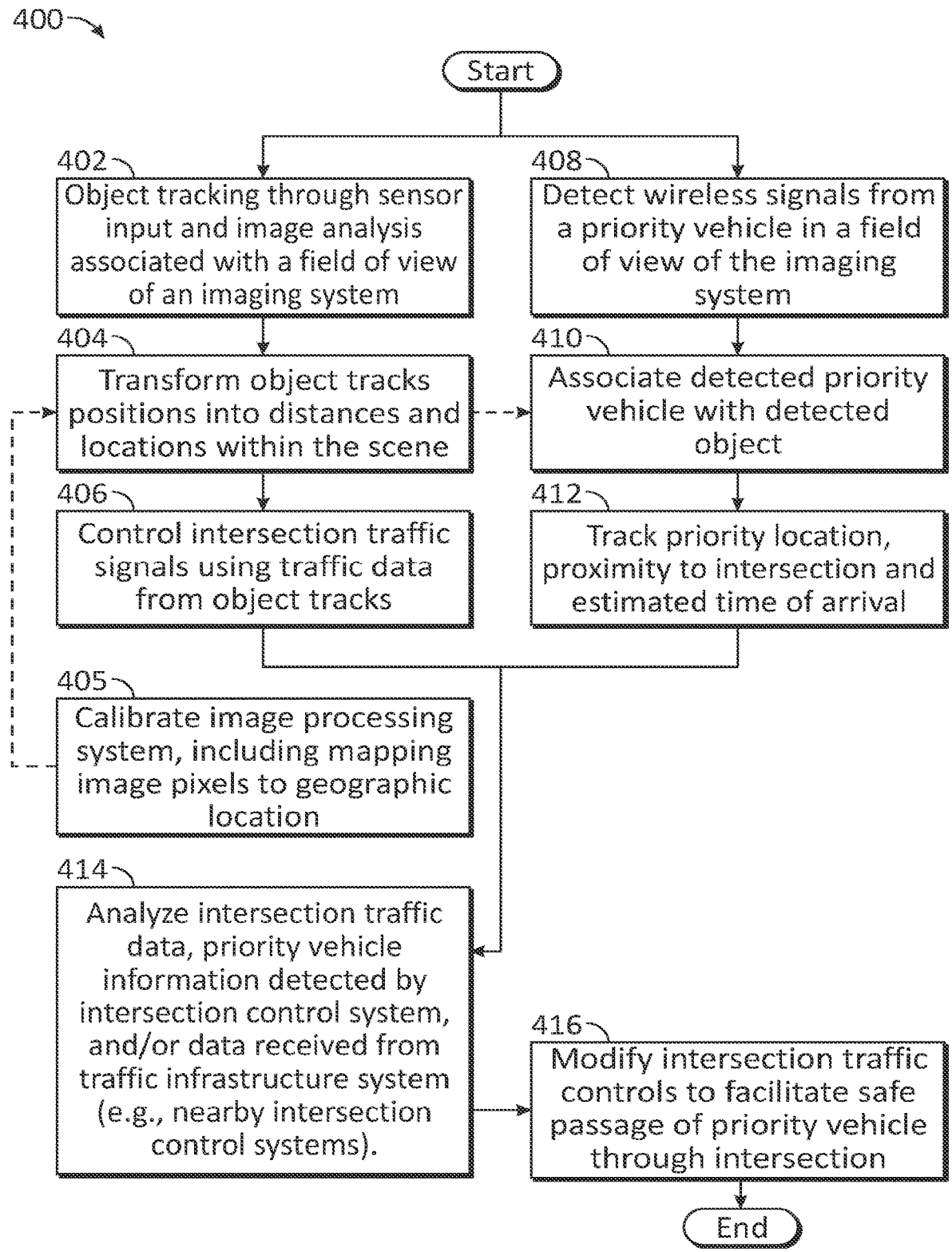
FIG. 4 is an example traffic control algorithm, in accordance with one or more embodiments.

Referring now to FIG. 4, an exemplary traffic control algorithm 400 in accordance with one or more embodiments will now be described. The algorithm tracks traffic through a monitored traffic zone such as an intersection in steps 402, 404 and 406. In step 402, a stream of images is captured and analyzed to detect and track objects through the field of view. The objects may include vehicles, animals, pedestrians and other objects appearing in the field of view. Other sensor input may also be compiled, such as loop detector data and radar data. The object tracks are transformed into real-world geographic locations within the scene in step 404. In some embodiments, the process includes a calibration process 405 to map image pixels to real-world geographic locations. The monitored traffic location is then controlled in accordance with the traffic data and object tracks in step 406.

Contemporaneous with steps 402-406, the algorithm also detects and processes priority vehicles approaching the traffic zone such as ambulance or fire engine. In step 408, the algorithm detects wireless signals from one or more priority vehicles. The priority vehicle is mapped to a detected object track in step 410, e.g., by matching received GPS coordinates of the priority vehicle with geographic location information determined through image processing. The priority vehicle is then tracked into and through the field of view, including determining proximity to the traffic zone and an estimated time of arrival in step 412.

In step 414, traffic data and priority vehicle information are correlated, along with data received from nearby intersection control systems (as available) and analyzed to determine traffic control actions. In step 416, the traffic control signaling for the traffic zone is modified to facilitate safe and efficient passage of the priority vehicle through the traffic zone. For example, the data may include physical locations of objects (e.g., vehicles, pedestrians) near an intersection and tracked paths and associated flow of traffic within a field of view of the traffic control system. The location information from image and other sensors may be converted into geographic locations including proximity to the traffic monitoring system, which may include locations associated with an entrance into the field of view and/or intersection, an exit from the field of view and/or intersection. The analysis may determine one or more positions in time where one or more priority vehicles associated with one or more wireless signals will have certain characteristics. In one embodiment, the data is analyzed to determine a location and time at which each priority vehicle would be expected to approach, enter and exit the intersection in view of the tracked traffic data and at least one traffic signal command sequence to facilitate passage of the priority vehicle through the intersection. In some embodiments, the control may further include transmitting instructions to a priority vehicle computer to modify its route in accordance with traffic condition and/or instructions and information to an operator of the vehicle.

Figure 5:
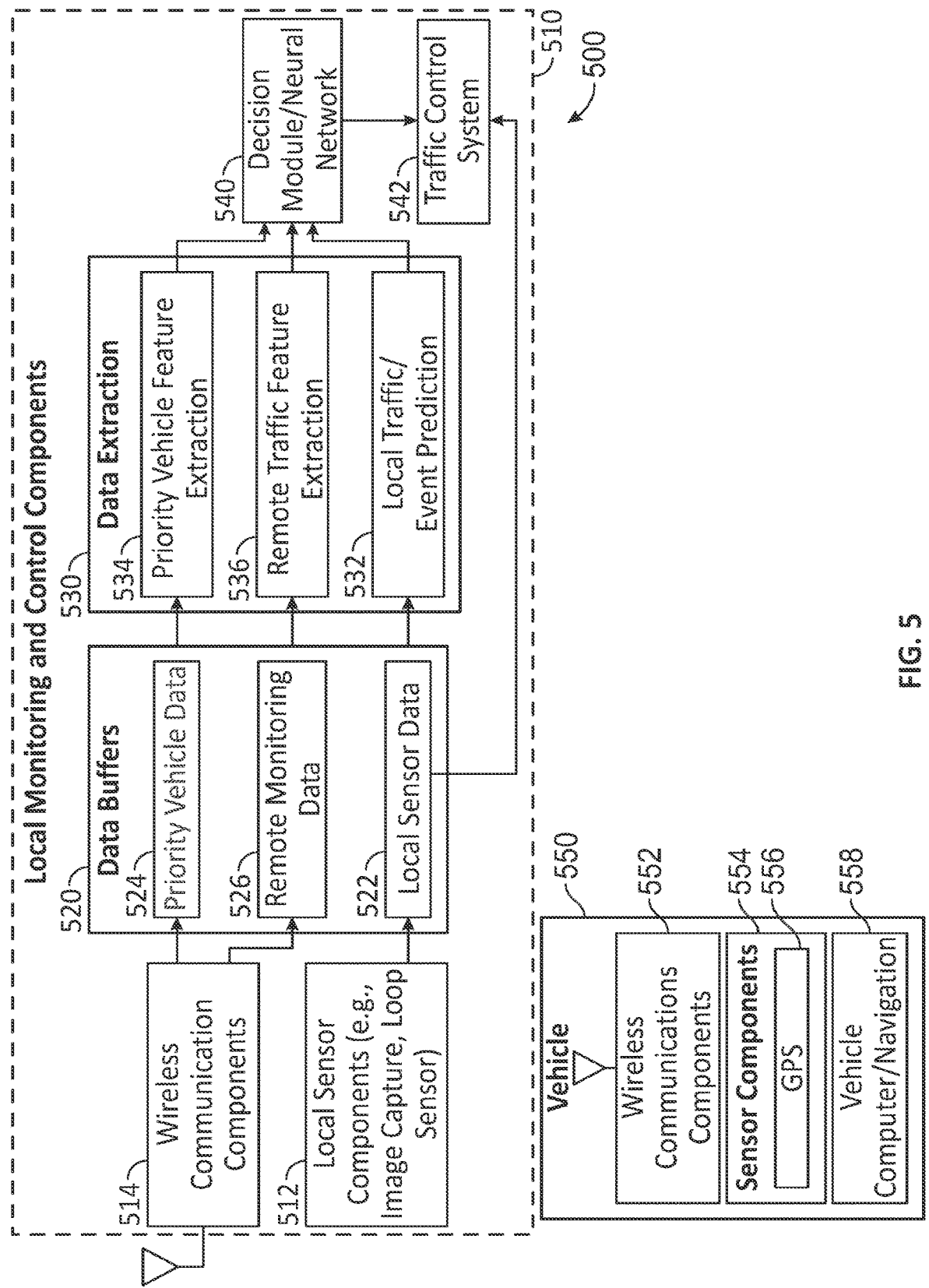
FIG. 5 is an example of monitoring and traffic control components, in accordance with one or more embodiments.

Referring to FIG. 5, various embodiments of systems and methods for controlling traffic systems will be described. As illustrated, the system 500 includes local monitoring and control components 510 configured to communicate with and/or detect at least one vehicle 550. The local monitoring and control components 510 include local sensor components (e.g., image capture, loop detector and other traffic monitoring sensors), wireless communication components 514 for communicating with at least one vehicle, data buffers 520 for storing received monitoring data (e.g., priority vehicle data 524, remote monitoring data 526 and/or local sensor data 522), data extraction modules 530, decision module 540 which may include a neural network, and a control and analytics system 542. In various embodiments, the monitoring components 510 may be implemented in one or more computing systems, sensor systems, communications systems and/or other devices in an infrastructure control system.

The vehicle 550 includes wireless communications components 552 operable to communicate with the wireless communications components 514 through a wireless communications protocol, such as Bluetooth, 802.11p, cellular, wifi or another wireless communications protocol. The vehicle 550 also includes sensor components 554, including GPS components 556, for generating real time position location of the vehicle 550, and a vehicle computer and/or navigation system 558 providing emergency instructions, route information and other information to operators of the vehicle and/or the local monitoring and control components 510.

The local sensor components 512 include one or more image sensors operable to capture images of a scene and image processing modules operable to identify and track objects in the captured images to generate a stream of object track data. The local sensor components 512 may further include other traffic feedback components, such as one or more loop detectors or radar systems. The wireless communications components 514 include a wireless sensor operable to receive communications from the vehicle 550, including data from at least one sensor component 554. The wireless communications components 514 may also receive data from other local monitoring systems (wirelessly or through a physical connection) and generate a stream remote monitoring data 526 (e.g., priority vehicles local to a remote system, traffic status of a remote system).

The data extraction modules 530 include feature extraction modules operable to determine feature characteristics associated with one or more priority vehicles (priority vehicle feature extraction module 534), remote traffic data received from other local monitoring systems or other information sources (remote traffic feature extraction module 536), and local traffic information (local traffic/event prediction module 532). The decision module 540 makes traffic control decisions based on the available data and may include a neural network trained to receive the extracted feature data and determine traffic control decisions to facilitate the passage of the priority vehicle(s) through the intersection (or other controlled roadway). The traffic control system 542 then modifies traffic control decisions and executes the traffic control actions in accordance with the decision module 540 output, which may include traffic signaling commands, instructions to the vehicle computer 558 and/or instructions to a vehicle operator.

Figure 6:
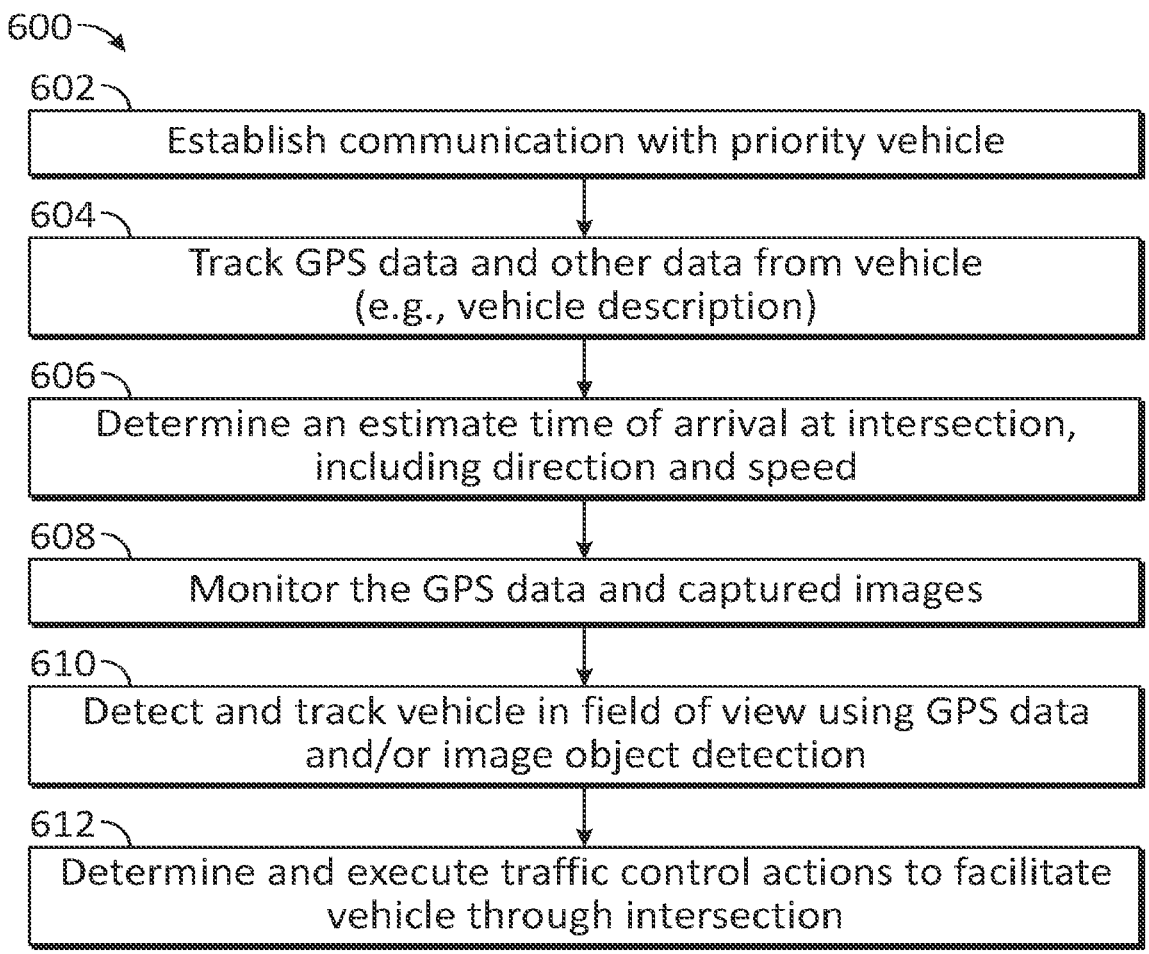
FIG. 6 is an example process for tracking a vehicle, in accordance with one or more embodiments.

An example process 600 for operating a local traffic monitoring system will now be described with reference to FIG. 6. In step 602, the local traffic monitoring system establishes wireless communications with a priority vehicle, which may include a secure protocol limiting access to emergency vehicles. In step 604, GPS and other available vehicle data is transmitted to the local traffic monitoring system and tracked. In various embodiments, the vehicle information may include GPS data, vehicle identifier, emergency identifier, destination and speed. In step 606, the local traffic monitoring system determines an estimated time of arrival of the vehicle at the monitored location (e.g., an intersection). In step 608 the local traffic monitoring system monitors received GPS data and captured images. In step 610, the local traffic monitoring system detects and tracks the vehicle in the field of view. In step 612, the local traffic monitoring system executes traffic control actions to facilitate passage of the vehicle through the monitored traffic zone.

Figure 7:
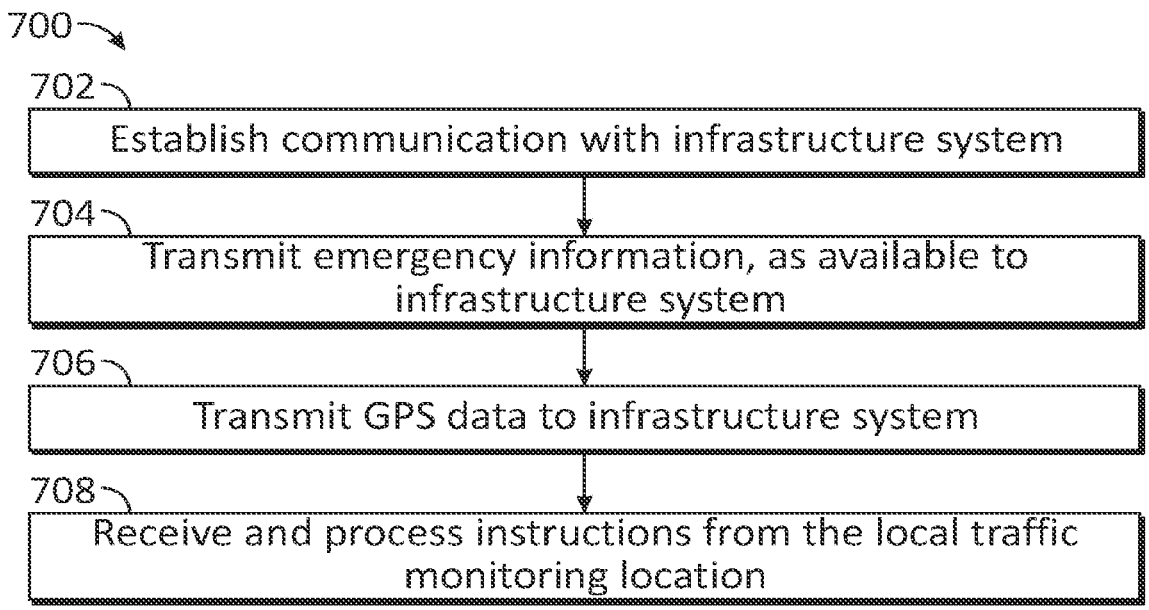
FIG. 7 is an example process for operating a vehicle, in accordance with one or more embodiments.

Referring to FIG. 7, an example process 700 for operating a priority vehicle will now be described. In step 702, the vehicle establishes communications with a local traffic monitoring system. In step 704, the vehicle transmits emergency information to the infrastructure system. In step 706 the vehicle transmits GPS data as the vehicle approaches and passes through the monitored traffic location. In some embodiments, the vehicle receives information and/or instructions from the infrastructure system (step 708) directing the vehicle through the traffic location or providing other instructions.

FIG. 8 illustrates an aerial map 810 illustrating a detected GPS location of a vehicle as it approaches an intersection, and a camera view 820 from a local traffic monitoring system showing a detected vehicle in the captured image (shown as images and corresponding representative line drawings).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed:

1. A system comprising:
a wireless signal sensor operable to detect and receive wireless signals emitted from at least one vehicle;
a first image sensor operable to capture a stream of images of a field of view; and
a traffic control system comprising a processor and a memory storing program instructions operable to cause the processor to:
perform a calibration process that causes the processor to:
receive a captured image of a GPS sensor positioned at a known geographic location within the field of view, and
generate a mapping between known geographic coordinates and pixels of the captured image associated with the GPS sensor;
extract geographic positioning information for the at least one vehicle from the wireless signals;
track the at least one vehicle's movement using the extracted geographic positioning information;
analyze a stream of images to detect an object comprising a plurality of pixels;
use the mapping to associate the pixels of the object with geographic coordinates of the object to track the object;
match the object to the at least one vehicle by comparing the geographic positioning information of the at least one vehicle with the geographic coordinates of the object;
track geographic movement of the at least one vehicle in the stream of images;
and
execute a traffic control action based on the geographic movement, wherein the traffic control action is determined to facilitate passage of the at least one vehicle through a monitored traffic control location.

2. The system of claim 1, wherein the wireless signal sensor is an 802.11p, Bluetooth, cellular, and/or wifi protocol sensor.

3. The system of claim 1, wherein the traffic control system is further operable to calculate an estimated time of arrival at the monitored traffic control location.

4. The system of claim 1, wherein the wireless signals are associated with an emergency vehicle and the monitored traffic control location is a traffic intersection.

5. The system of claim 1, wherein the at least one vehicle comprises an emergency vehicle and the processor is further operable to:
detect and track objects in the stream of images corresponding to one or more obstacles for emergency vehicle at or near the monitored traffic control location;
transmit information of the one or more obstacles to the emergency vehicle; and
modify the traffic control action based on the one or more obstacles.

6. The system of claim 1, wherein the extracted geographic positioning information for the at least one vehicle includes global positioning system data received from a global positioning system sensor.

7. The system of claim 1, wherein the processor is further operable to map global positioning data with one or more pixel locations corresponding to detected objects in the stream of images.

8. The system of claim 1, wherein the processing system is further operable to determine an estimated time of arrival for the at least one vehicle at the monitored traffic control location and to transition between using geographic positioning information and pixel coordinates based on the vehicle being within the field of view.

9. The system of claim 1, wherein the processing system is disposed at an intersection and the traffic control action includes changing a state of at least one traffic signal.

10. A method comprising:
detecting and receiving wireless signals emitted from at least one vehicle;
capturing a stream of images of a field of view; and
operating a traffic control system to control at least one traffic control signal in a monitored traffic control location, comprising:
calibrating, the calibrating comprising:
receiving a captured image of a GPS sensor positioned at a known geographic location within the field of view, and
generating a mapping between known geographic coordinates and pixels of the captured image associated with the GPS sensor;
extracting geographic positioning information for the at least one vehicle from the wireless signals;
analyzing a stream of images to detect an object comprising a plurality of pixels;
using the mapping to associate the pixels of the object with geographic coordinates of the object to track the object;
matching the object to the at least one vehicle by comparing the geographic positioning information of the at least one vehicle with the geographic coordinates of the object;
tracking geographic movement of the at least one vehicle in the stream of images; and
executing a traffic control action based on the geographic movement, wherein the traffic control action is determined to facilitate passage of the at least one vehicle through a monitored traffic control location.

11. The method of claim 10, wherein the wireless signals are 802.11p, Bluetooth, cellular, and/or wifi protocol signals.

12. The method of claim 10, further comprising calculating an estimated time of arrival at the monitored traffic control location, and further comprising transitioning between using geographic positioning information and pixel coordinates based on the vehicle being within the field of view.

13. The method of claim 10, wherein the wireless signals are associated with an emergency vehicle and the monitored traffic control location is a traffic intersection.

14. The method of claim 10, further comprising:
detecting and tracking objects in the stream of images corresponding to one or more obstacles for the at least one vehicle at or near the monitored traffic control location; and
modifying the traffic control action based on the one or more obstacles, wherein the at least one vehicle comprises an emergency vehicle.

15. The method of claim 10, wherein the extracted geographic positioning information for the at least one vehicle includes global positioning system data received from a global positioning system sensor.

16. The method of claim 10, further comprising mapping global positioning data with one or more pixel locations corresponding to detected objects in the stream of images.

17. The method of claim 10, further comprising determining an estimated time of arrival for the at least one vehicle at the monitored traffic control location.

18. The method of claim 10, wherein the traffic control system is disposed at an intersection and the traffic control action includes changing a state of at least one traffic signal.

19. The system of claim 1, wherein the first image sensor is further operable to calibrate based on a tilt angle and/or height of the first image sensor.

20. The method of claim 10, further comprising calibrating the first image sensor based on a tilt angle and/or height of the first image sensor.

* * * * *